United States Patent [19]

Shibuya et al.

[11] Patent Number: 4,642,656

[45] Date of Patent: Feb. 10, 1987

[54] THERMAL PRINTER

[75] Inventors: Kouji Shibuya, Machida; Chiharu Imazeki, Yokohama, both of Japan

[73] Assignee: Minolta Camera Kabushiki Kaisha, Osaka, Japan

[21] Appl. No.: 813,766

[22] Filed: Dec. 27, 1985

[30] Foreign Application Priority Data

Dec. 27, 1984 [JP] Japan .............................. 59-281542

[51] Int. Cl.[4] .............................................. G01D 15/16

[52] U.S. Cl. .............................. 346/76 PH; 346/105; 400/120; 400/356; 400/224.2

[58] Field of Search ............. 346/76 PH, 105, 134 R; 400/120, 356, 224.2

[56] References Cited

U.S. PATENT DOCUMENTS 4,313,376 2/1982 Swope et al. .................. 346/76 PH 4,507,667 3/1985 Tsuboi ........................... 346/76 PH

*Primary Examiner*—Arthur G. Evans

*Attorney, Agent, or Firm*—Wenderoth, Lind & Ponack

[57] ABSTRACT

A thermal printer automatically varies torque of a slip clutch provided between a motor and an ink film takeup roller with movements of a thermal head such that the torque transmitted to the takeup roller is smaller when the thermal head is in a transfer position than when the thermal head is in a non-transfer position. This assures that the takeup roller is driven properly by increasing the torque transmitted to the takeup roller when the thermal head is in the non-transfer position and an ink film is taken up in a large amount. When the thermal head is in the transfer position and the ink film is taken up in a small amount, the torque transmitted to the takeup roller is reduced to avoid a great tension acting on the ink film.

7 Claims, 8 Drawing Figures

1
BGR → YMC
#10
SEND Nth COLOR DATA FOR ONE LINE TO HEAD
#11
PRINT
#12
ONE LINE PAPER FEED
#13
ALL LINES FINISHED?
N
Y
#14
COUNTER N←N+1
#15
HEAD RELEASE
#16
RETURN PAPER
#17
3
FEED A (CLUTCH HIGH V)
#18
N>3
N
Y
2
#19
DISCHARGE PAPER
#21
MOTOR OFF
#22
CLUTCH OFF
#23
END

THERMAL PRINTER

BACKGROUND OF THE INVENTION

1. Field of the Invention

The present invention relates to a thermal printer, and more particularly to a thermal printer comprising a platen roller for advancing a transfer paper and an ink film in tight contact with each other in a longitudinal direction thereof. A thermal head for thermally transfers ink onto the transfer paper. The thermal head is movable between a transfer position to hold the transfer paper and the ink film in tight contact with each other between the thermal head and the platen roller and a non-transfer position to release the transfer paper and the ink film. A takeup roller takes up the ink film after the transfer.

2. Description of the Prior Art

In known thermal printers of this type, the platen roller is driven by a motor such as a pulse motor which is capable of stopping the roller at target positions with high precision to realize high precision for printing positions. The takeup roller requires less precision for its takeup action and is driven by an inexpensive motor such as a fixed speed motor. Therefore, a proper takeup action is carried out by driving the takeup roller drive motor when the thermal head is also in the transfer position. Relative rotation between the takeup roller and the takeup roller drive motor is permitted by a slip clutch.

In the prior art, a torque transmitted by the slip clutch has a fixed value as does a starting torque of the takeup roller drive motor. The transmitted torque and the starting torque are determined to enable the takeup roller to perform the takeup function as desired even in a heavy load condition in which a large amount of ink film is taken up.

With the above prior art arrangement, however, the ink film is subjected to a great deal of tension under a small load condition in which a small amount of ink film is taken up. This provides possibilities of trouble such as the ink film becoming torn. Because of the tension noted above, a separator roller for guiding the ink film away from the transfer paper tends to recede to a considerable extent to a position intermediate the ends of the ink film. As a result, the separation of the ink film takes place earlier at an intermediate position than at both ends. This impairs the quality of transfer at the intermediate position or in certain cases causes a total failure of the transfer. Such trouble may of course be checked by reducing a maximum amount of ink film takeup. However this would require a small roll of ink film which must be changed frequently. Therefore, this solution is hardly practicable.

SUMMARY OF THE INVENTION

The object of the present invention is to provide a thermal printer wherein the ink film may be taken up in large amounts but the above-noted trouble does not occur during the small load condition in which small amounts of ink film are taken up by the takeup roller.

The present invention has an advantage in terms of maintenance in that large rolls of ink film may be used which do not need frequent changing. Also, an excellent printing operation is carried out free from the trouble of the ink film becoming torn and from the trouble of the transfer results being of poor quality or of the total failure of the transfer.

The thermal printer according to the present invention is characterized in that means are provided to automatically vary the transmission torque of the slip clutch or the starting torque of the takeup roller drive motor with the movements of the thermal head such that the torque transmitted to the takeup roller is smaller when the thermal head is in the transfer position than when the thermal head is in the non-transfer position.

In other words, the takeup roller is driven properly by increasing the torque transmitted to the takeup roller when the thermal head is in the non-transfer position and a large amount of ink film is taken up. When the thermal head is in the transfer position and a small amount of ink film is taken up, the torque transmitted to the takeup roller is reduced to avoid a great amount of tension acting on the ink film. Owing to this feature the thermal printer according to the present invention is excellent both in terms of manufacture and in terms of practical use.

Other advantages of the invention will be apparent from the following description.

DETAILED DESCRIPTION OF THE PREFERRED EMBODIMENTS

Embodiments of the present invention will be described hereinafter with reference to the accompanying drawings.

Figure 1:
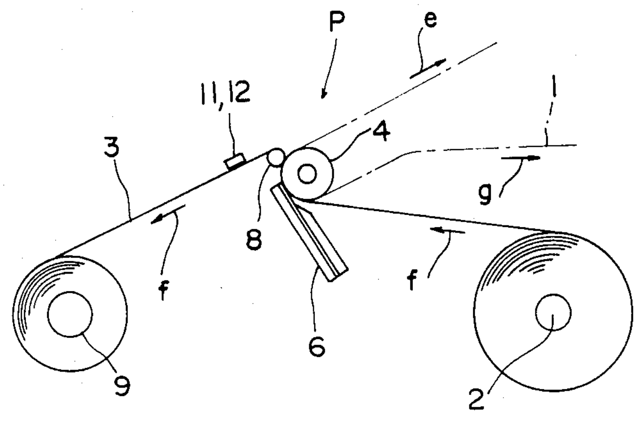
FIG. 1 is a schematic side view of a printing section of a thermal printer embodying the present invention.
Figure 2:
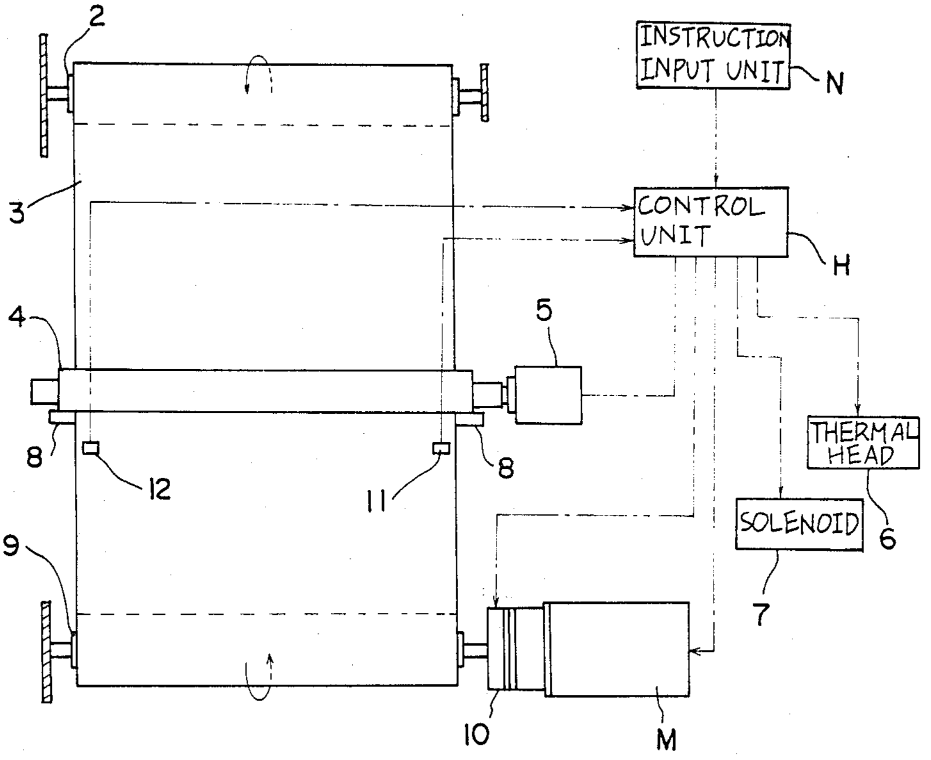
FIG. 2 is a schematic plan view of the printing section.

A thermal printer embodying the present invention comprises a printing section P as shown in FIG. 1. The printing section P receives a transfer paper 1 which is conveyable in opposite directions by a conveyor not shown. The transfer paper 1 is guided by a platen roller 4 which is driven by a pulse motor 5, to advance in a longitudinal direction thereof in tight contact with an ink film 3 fed from a supply roller 2. A thermal head 6 approximately equal in width to the transfer paper 1 is provided to thermally transfer thermally fusible ink of the ink film 3 onto the transfer paper 1. A solenoid 7 is provided to urge the thermal head 6 toward the platen roller 4 by means of a spring, not shown, so that the thermal head 6 is movable between a transfer position to hold the transfer paper 1 and ink film 3 in tight contact with each other between the thermal head 6 and the platen roller 4 and a non-transfer position to release the transfer paper 1 and ink film 3. A separator roller 8 is provided to guide the ink film 3 away from the transfer paper 1 after the ink transfer. The ink film 3 guided by the separator roller 8 is taken up by a takeup roller 9. The takeup roller 9 is driven by a motor M, and a magnetic particle or other type electromagnetic clutch 10 is provided between the takeup roller 9 and the motor M which slips to permit relative rotation between the takeup roller 9 and the motor M.

Figure 3:
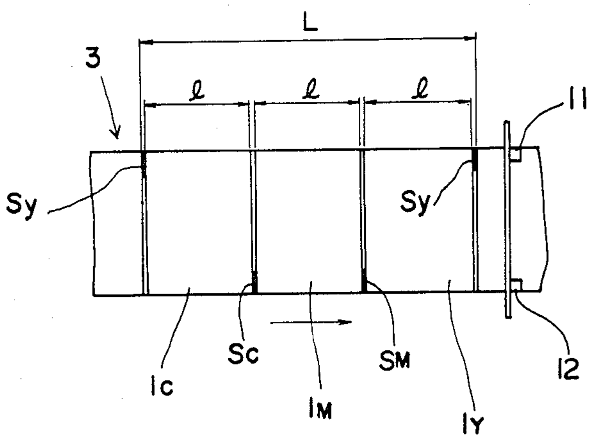
FIG. 3 is a plan view of an ink film.

As shown in FIG. 3, the ink film 3 comprises a film base, not shown, approximately equal in width to the transfer paper 1 and coated with ink layers of three different colors, yellow, magenta and cyan, in the mentioned order. Each layer has a predetermined length l. These layers $I_Y$, $I_M$ and $I_C$ have position indicating $S_Y$, $S_M$ and $S_C$ marks at leading ends thereof, respectively. The ink film 3 includes a plurality of sections arranged in series, each section having a length L and the ink layers $I_Y$, $I_M$ and $I_C$ and the position indicating marks $S_Y$, $S_M$ and $S_C$ as described above.

The printing section P further comprises sensors 11 and 12 for detecting the position indicating marks $S_Y$, $S_M$ and $S_C$ and transmitting detection data to a control unit H. In accordance with these detection data received from the sensors 11 and 12, prestored data, and instruction data received from an instruction input unit N comprising a keyboard or switches, the control unit H outputs operational instructions to various devices such as the paper conveyor, the platen roller drive motor 5, the solenoid 7 for moving the thermal head 6, the takeup roller drive motor M and the electromagnetic clutch 10, to carry out a printing operation as hereinafter described.

In operating the electromagnetic clutch 10 by an instruction signal from the control unit H, a voltage supply for the clutch 10 is automatically adjusted to be higher when the thermal head 6 is in the non-transfer position than when the thermal head 6 is in the transfer position. Thus, torque transmission by the electromagnetic clutch 10 is automatically varied with the movement of thermal head 6 such that the takeup roller 9 is driven by a smaller torque when the thermal head 6 is in the transfer position than when the thermal head 6 is in the non-transfer position.

In the description to follow, the operation of the takeup roller drive motor M in the greater drive torque state will be referred to as ink film feed A and that in the smaller drive torque state as ink film feed B.

Figure 5:
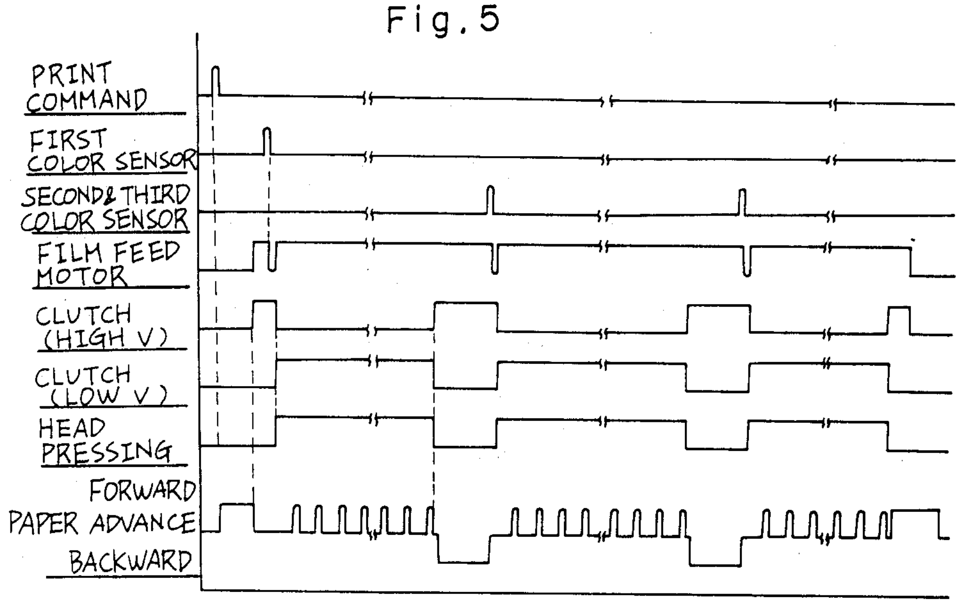
FIG. 5 is a time chart showing actions of various elements of the printer during the transfer operation.
Figure 4A:
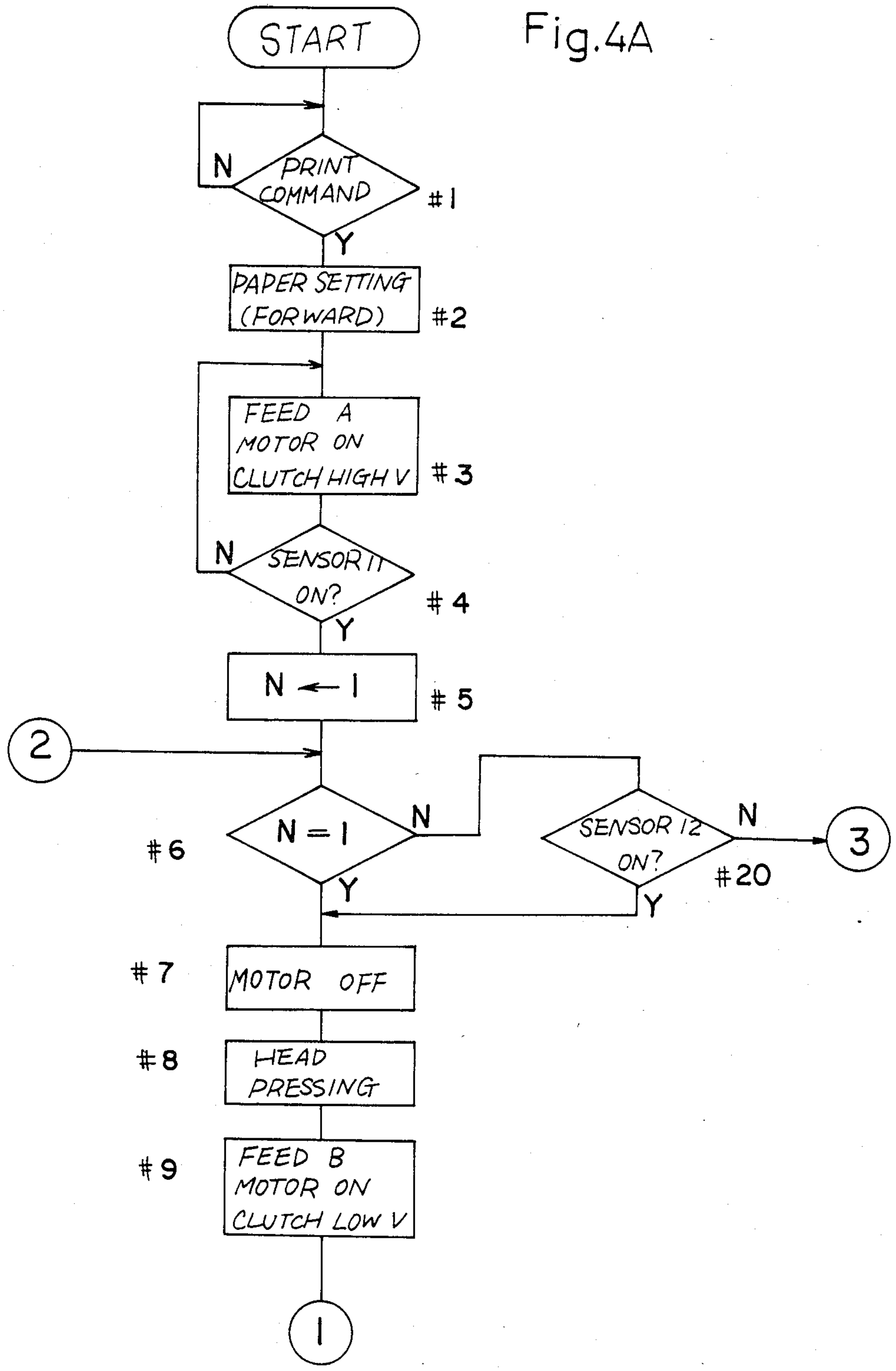
FIGS. 4A and 4B are flow charts of a transfer operation, respectively.
Figure 4B:
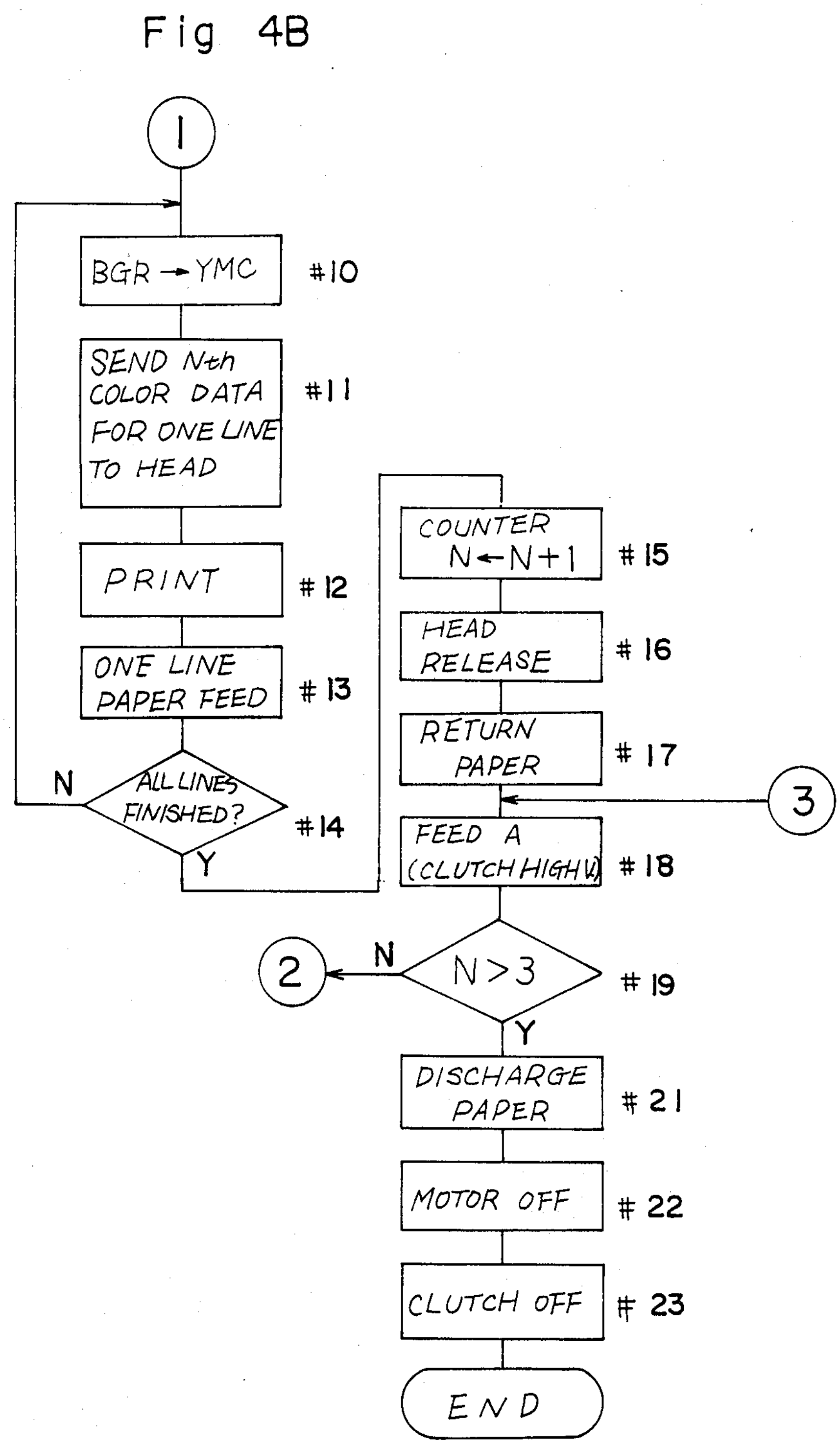

Next, the printing operation using the above-noted ink film 3 will be described with reference to the flow charts shown in FIGS. 4A and 4B and to the time chart shown in FIG. 5 representing operations of the various devices.

When a print command is issued from the instruction input unit N (step 1), the transfer paper 1 is advanced in a direction e in FIG. 1 to a transfer start position (step 2) and the ink film 3 is advanced in a direction f by ink film feed A (step 3). When the yellow mark $S_Y$ is detected by the film position sensor 11 (step 4), a counter is set to "1" (step 5). When at step 6 the counter value is judged to be "1", the program proceeds to step 7 to stop the takeup roller drive motor M.

Thereafter, at step 8 the thermal head 6 is moved to the transfer position to press against the platen roller 4, and then at step 9 the takeup roller drive motor M is operated and the voltage supplied to the electromagnetic clutch 10 is switched to a low voltage for ink film feed B.

Next, at step 10 RGB data which are information on light hues in a CRT, not shown, are converted into YMC data which are informtion of ink hues corresponding to one line. At step 11 a portion in the YMC data whose number in order corresponds to count N (for example, yellow corresponds to N=1) is forwarded to the thermal head 6, and at step 12 ink in a corresponding portion, the yellow layer for example, on the ink film 3 is heated by the thermal head 6 and transferred onto the transfer paper 1. Each time the transfer for one line is completed, the transfer paper 1 and the ink film 3 in tight contact with each other are advanced by an amount corresponding to one line in the e direction and f direction, respectively (step 13). At step 14 whether all lines have been printed or not is judged and, if not, steps 10 through 13 are repeated to transfer the yellow portion, for example, for all lines.

After the transfer, the transfer paper 1 and ink film 3 are cooled while being advanced in tight contact with each other. The ink film 3 is guided away from the transfer paper 1 by the separator roller 8 whereby the ink film 3 and the transfer paper 1 are separated.

If at step 14 the transfer for all the lines is judged to have completed, the counter is incremented at step 15 and the thermal head 6 is moved to the non-transfer position away from the platen roller 4 at step 16. At step 17 the transfer paper 1 separated from the ink film 1 is returned in a direction g in FIG. 1 to the start position. Simultaneously therewith, at step 18 the voltage supplied to the electromagnetic clutch 10 is switched to a high voltage for ink film feed A. At step 19 a judgment is made as to whether the count N is greater than "3" or not, that is whether the three color printing has completed or not, and, if not, the program returns to step 6. At step 20 the ink film 3 is advanced in the f direction until the sensor 12 detects the mark $S_M$ indicating magenta. If the mark $S_M$ indicating magenta is detected at step 20, the foregoing steps 7 et seq. are effected to transfer the magenta portion.

After the transfer of the magenta portion is completed, the final, cyan portion is transferred by the above operation.

If the count exceeds "3" upon checking the counter at step 19, that is if the transfer of all the three colors is completed, at steps 21–23 the transfer paper 1 is fed out to a cutoff position, the takeup roller drive motor M is stopped and the voltage supply to the electromagnetic clutch 10 is cut off to stop the transfer operation.

In order that the torque transmitted to the takeup roller 4 be greater when the thermal head 6 is in the non-transfer position than when the thermal head 6 is in the transfer position, a voltage supplied to the takeup roller drive motor M may be automatically adjusted by the instruction signal of the control unit H with the movement of the thermal head 6 thereby to automatically vary a starting torque of the motor M.

Figure 6:
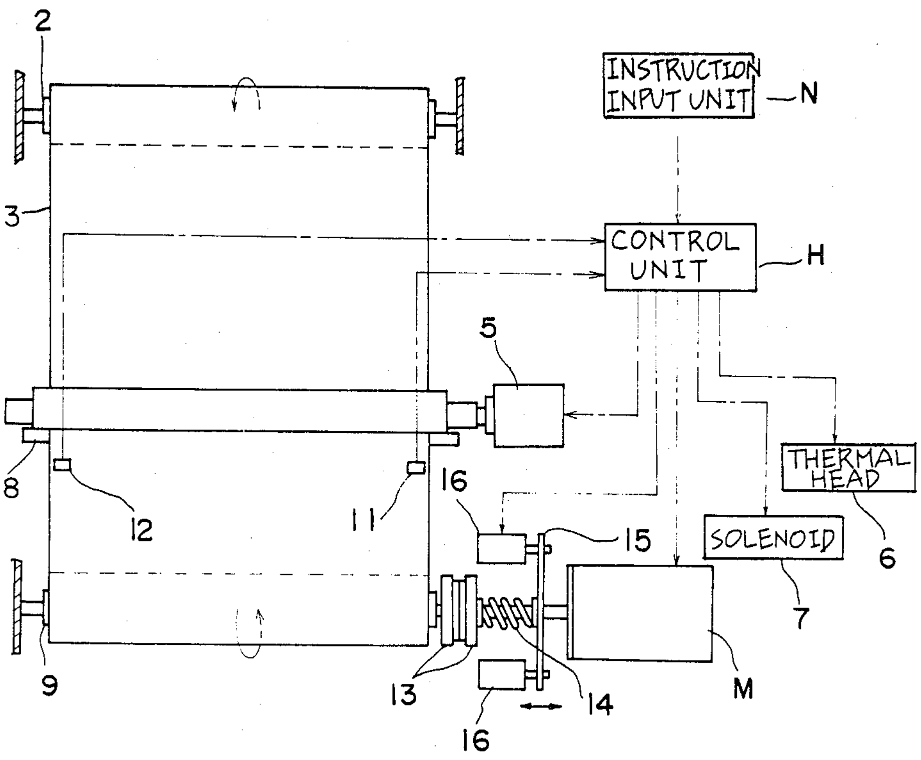
FIGS. 6 through 7 are schematic views of other embodiments, respectively.

As shown in FIG. 6, the slip clutch may comprise, instead of the electromagnetic clutch 10, a pair of friction type transmission plates 13 retained in tight contact with each other by a spring 14, and a plurality of pressing force adjusting solenoids 16 for varying a position of a reaction plate 15 of the spring 14. In this construction the number of solenoids to act is automatically varied with the movement of the thermal head 6.

Figure 7:
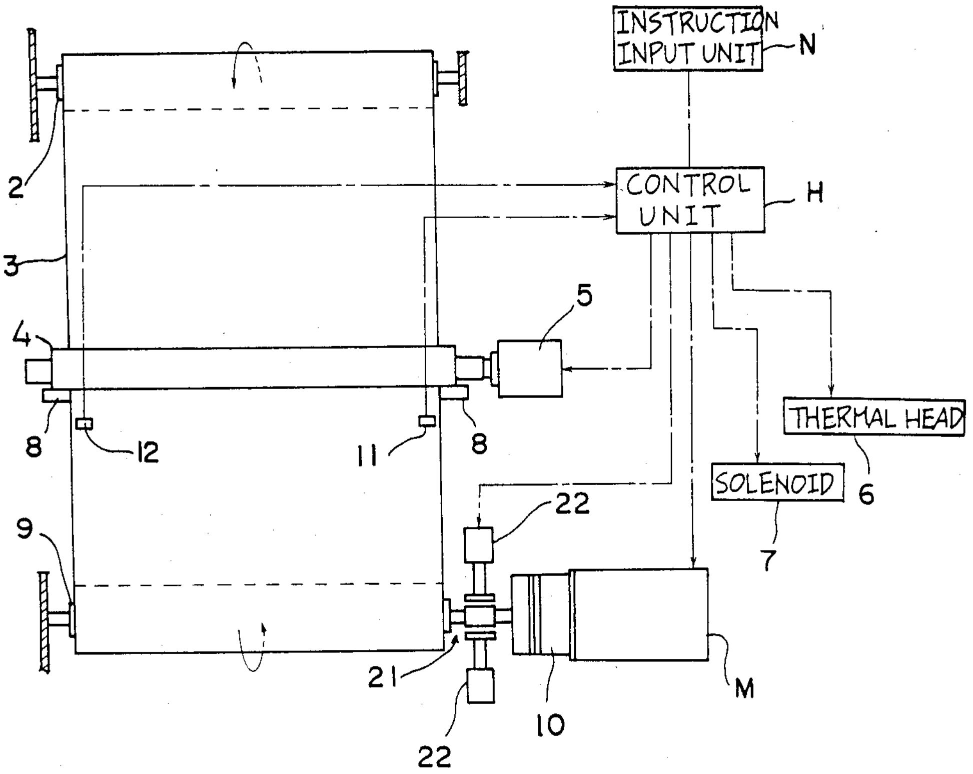

Further, as shown in FIG. 7, a brake 21 may be provided to brake the takeup roller only when the thermal head 6 is in the transfer position. And means may be provided to automatically operate a brake actuator 22 with the movement of the thermal head 6 in response to an instruction signal from the control unit H which controls the various devices. As shown in FIG. 8, the takeup roller drive motor may comprise a pulse motor 24 adapted to stop at target positions with high precision. In this case the takeup roller drive pulse motor 24 and the platen roller drive pulse motor 5 may be operated synchronously by the instruction signals from the control unit H.

While the three colors, yellow, magenta and cyan, generally are sufficient for coating the ink film 3, a total of six colors including intermediate colors thereof may be applied to the film 3. The number of colors may be selected as appropriate, possibly with an addition of black to increase image definition. The colors may be arranged in any appropriate order. In the case of three colors, yellow, magenta and cyan, a natural image is obtained by transferring the colors in the order of yellow, magenta and cyan rather than cyan magenta and yellow. Where black is added, good results are obtained by transferring black after all colors.

The thermal head 6 is approximately equal in width to the transfer paper 1 and may be replaced with a thermal head having a relatively small width and adapted to transfer the ink while moving transversely of the transfer paper 1. The shape of and mounting structure for the thermal head may be varied as appropriate.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

We claim:

1. A thermal printer for forming an image by thermally transferring ink from an ink film to transfer paper at a printing station, comprising:

means for supplying said ink film past the printing station;

a takeup roller means for taking up said ink film from said supply means;

takeup roller drive means for exerting a torque to rotate said takeup roller means for taking up said ink film;

a platen roller located at said printing station;

a thermal head located adjacent said platen roller at said printing station;

paper feed means for feeding said transfer paper to said printing station between said thermal head and said platen roller and for maintaining said transfer paper in tight contact against said ink film;

means for moving said thermal head between a first position in which said thermal head is in pressing engagement against said platen roller and said transfer paper maintained in tight contact against said ink film and a second position in which said thermal head is out of pressing engagement with said platen roller and said transfer paper maintained in tight contact with said ink film;

control means connected to said drive means for controlling said torque exerted by said takeup roller drive means for rotating said takeup roller means in accordance with said first and second positions of said thermal head, said control means having means for causing a first torque to be exerted on said takeup roller means when said thermal head is in said first position and a second torque to be exerted on said takeup roller means when said thermal head is in said second position, said first torque being of a smaller magnitude than said second torque.

2. A thermal printer as claimed in claim 1 wherein, said takeup roller drive means includes a power source and a clutch having a variable power transmission efficiency for transmitting power from said power source through said clutch to said takeup roller means.

3. A thermal printer as claimed in claim 2 wherein, said control means is comprised of means for controlling said clutch for causing said clutch to maintain a higher transmission efficiency when said thermal head is in said second position than when said thermal head is in said first position.

4. A thermal printer as claimed in claim 1 wherein, said takeup roller drive means includes a power source and a brake means for reducing the drive output of said power source, said brake means exerting a variable braking power.

5. A thermal printer as claimed in claim 4 wherein, said control means is comprised of means for controlling said brake means for causing said brake means to exert a braking force that is of a larger magnitude when said thermal head is in said second position than when said thermal head is in said first position.

6. A thermal printer for forming a thermal image by thermally transferring ink from an ink film to transfer paper at a printing station comprising:

means for supplying said ink film past the printing station;

a takeup roller means for taking said ink film from said supplying means;

takeup roller drive means for exerting a torque to rotate said takeup roller means to takeup said ink film;

a platen roller located at said printing station;

a thermal head located adjacent said platen roller at said printing station;

paper feed means for feeding said transfer paper to said printing station between said thermal head and said platen roller and for maintaining said transfer paper in tight contact against said ink film;

takeup roller drive means for exerting a torque to rotate said takeup roller means for taking up said ink film;

a platen roller located at said printing station;

paper feed means for feeding said transfer paper to said printing station and for maintaining said transfer paper in tight contact against said ink film;

means for moving said thermal head between a first position in which said thermal head is in pressing engagement against said platen roller and said transfer paper maintained in tight contact against said ink film and a second position in which said thermal head is out of pressing engagement with said platen roller and said transfer paper maintained in tight contact with said ink film;

control means for controlling the torque exerted by said takeup roller drive means for rotating said takeup roller means in accordance with said first and second positions of said thermal head.

7. A thermal printer as claimed in claim 3 wherein said clutch is a magnetic particle type clutch.

* * * * *